United States Patent [19]

LaSota

[11] Patent Number: 4,835,425
[45] Date of Patent: May 30, 1989

[54] LINEAR MOTOR

[76] Inventor: Larry LaSota, 15745 North Park, East Detroit, Mich. 48021

[21] Appl. No.: 172,486

[22] Filed: Mar. 24, 1988

[51] Int. Cl.⁴ .................... H02K 41/03; H01F 7/08
[52] U.S. Cl. ........................................ 310/14; 310/23; 335/253
[58] Field of Search ...................... 310/12, 13, 14, 15, 310/16, 17, 18, 19, 20, 23; 318/135; 335/253, 254, 255, 77

[56] References Cited

U.S. PATENT DOCUMENTS

| | | | |
|---|---|---|---|
| 887,344 | 5/1908 | Nelson | 188/65.1 |
| 2,935,663 | 5/1960 | Pollack | 317/190 |
| 3,219,854 | 11/1965 | McLaughlin | 310/14 |
| 3,275,964 | 9/1966 | Kumm | 335/259 |
| 3,344,377 | 9/1967 | Clements | 335/259 |
| 3,430,120 | 2/1969 | Kotaka et al. | 318/135 |
| 3,445,688 | 5/1969 | Thorel et al. | 310/14 |
| 3,491,319 | 1/1970 | Cox et al. | 335/259 |
| 3,495,147 | 2/1970 | Flora | 318/135 |
| 3,713,059 | 1/1973 | Tada | 335/259 |
| 3,763,412 | 10/1973 | Detrick et al. | 318/135 |
| 3,825,160 | 7/1974 | Lichtenberger | 226/59 |
| 3,895,281 | 7/1975 | Corbaz | 318/687 |
| 4,242,606 | 12/1980 | Nonnenmann | 310/12 |
| 4,327,344 | 4/1982 | Luckenbach | 335/253 |
| 4,352,048 | 9/1982 | Schulze | 318/135 |
| 4,358,691 | 11/1982 | Naylor | 310/12 |
| 4,640,811 | 2/1987 | Peletan | 376/228 |

Primary Examiner—Peter S. Wong
Assistant Examiner—Judson H. Jones
Attorney, Agent, or Firm—Basile and Hanlon

[57] ABSTRACT

A linear motor provides stepwise, incremental advance of a movable member. The linear motor includes an electric coil surrounded by a magnetic core. A magnetic movable pole member is coaxially aligned with a magnetic plunger member and extends through the core and coil. Opposed faces of the movable pole member and the plunger are separated by an air gap. An incremental advance member is fixedly attached to the plunger and extends outward from the movable pole member. A biasing spring is connected between the incremental advance member and the pole member to bias the pole member away from the plunger when electric current has been removed from the coil to re-establish the air gap between the pole member and the plunger. Latches are associated with the pole member and the plunger to provide unidirectional movement only of the pole member and the plunger when a magnetic field induced in the core when current is applied to the coil causes advance of the plunger into contact with the pole member and an incremental advance of the incremental advance member a distance equal to the original air gap. When current is removed from the coil, the magnetic field collapses and the biasing spring urges the pole member away from the plunger re-establishing the air gap for the next sequential energization of the coil.

7 Claims, 2 Drawing Sheets

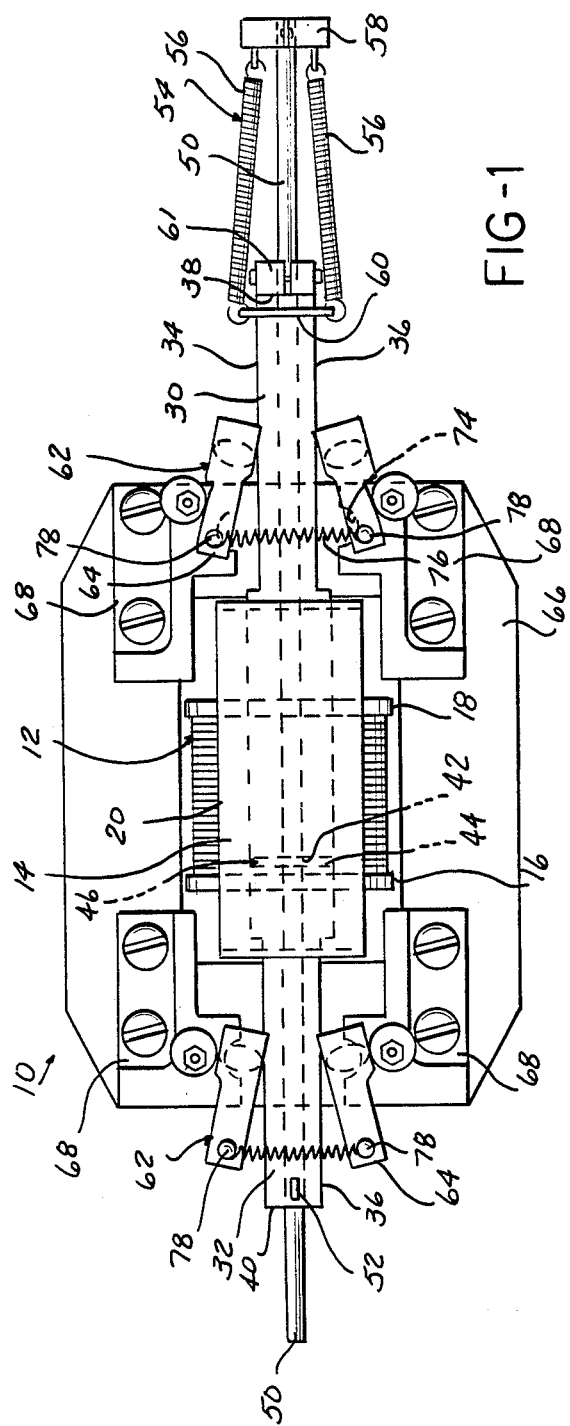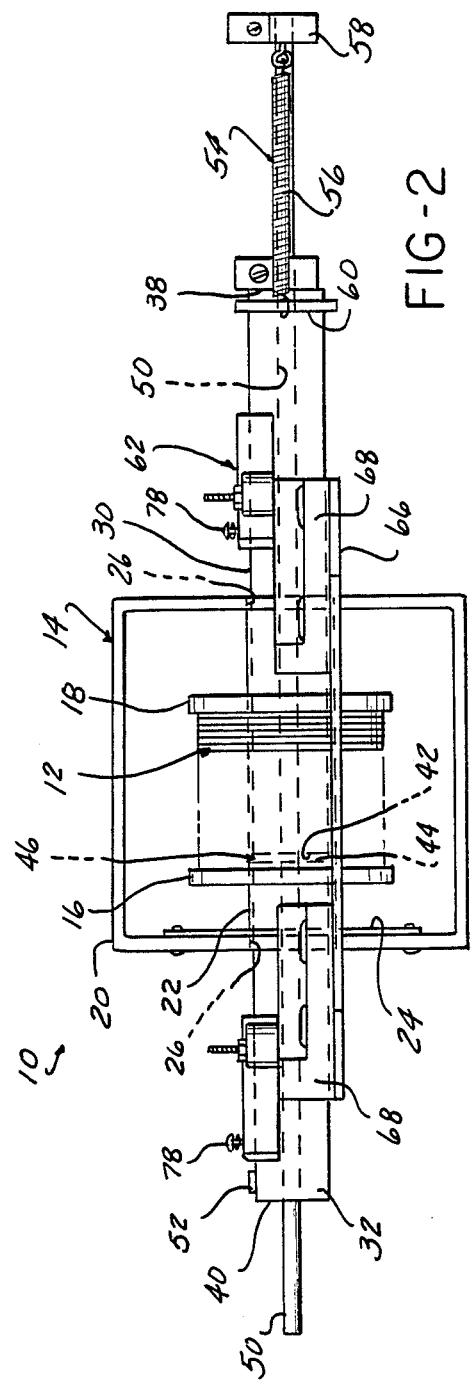

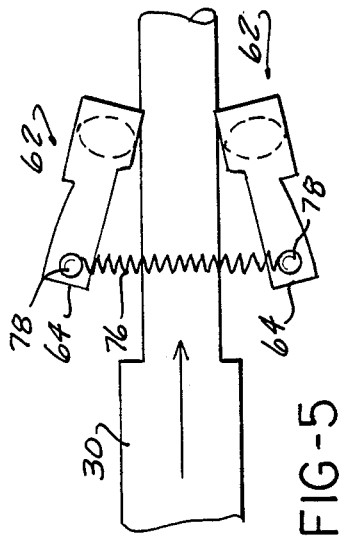
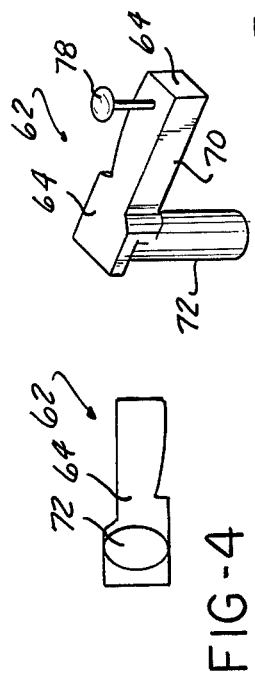
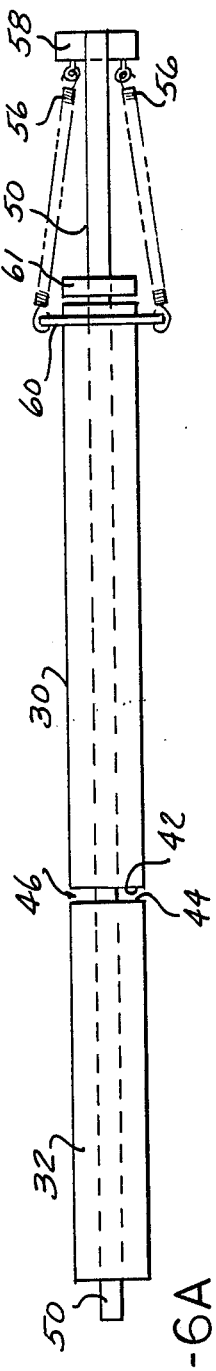
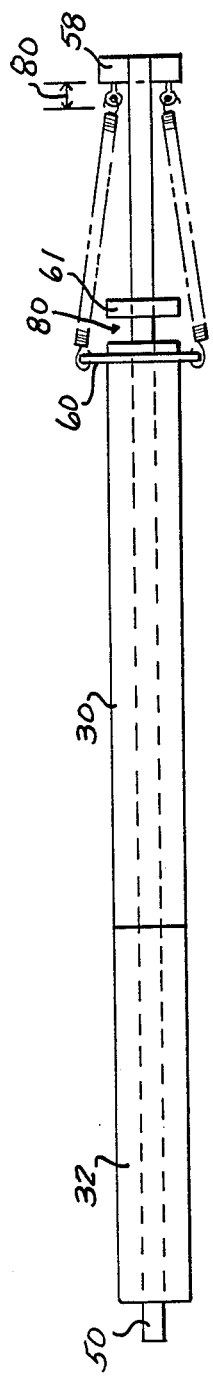
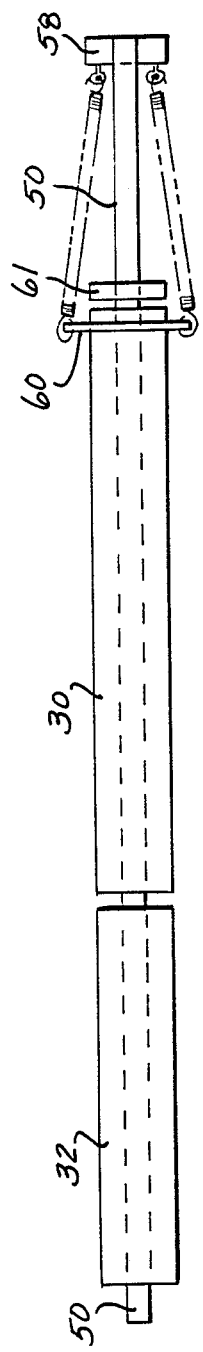

LINEAR MOTOR

BACKGROUND OF THE INVENTION

1. Field of the Invention

The present invention relates, in general, to electromagnetic actuating devices and, specifically, to linear positioning devices utilizing electromagnetic actuating means to control the incremental advance of a movable member.

2. Description of the Prior Art

Electromagnetic actuating devices have been employed to incrementally advance a magnetic member upon repeated energization of the device. Such devices utilize an electrical coil and a magnetic core including at least one movable core member which is attracted to another portion of the core by the magnetic flux induced in the core when electric current is applied to the coil.

Numerous configurations for electromagnetic actuating devices have been devised for different applications and some include a plurality of coils and movable cores for variable, discrete advance of a movable core depending upon the magnitude of the current applied to the coils or the number of coils which are energized. Other incremental positioning devices simply operate in an on/off mode, that is, the movable member moves to one position when the coil is energized and then returns to the start position when current is removed from the electric coil.

Spring biasing means have also been employed to reset the movable core in its start position spaced from the other core portion when the electric current is removed from the coil. Pawl and latch devices have also been employed in such linear actuators to hold the movable member in a stationary advanced position after power has been removed from the coil.

It would be desirable to provide a novel linear motor for incrementally advancing a movable member or workpiece in a stepwise fashion upon repeated energization of the motor. It would also be desirable to provide a linear motor which has a simple construction and can be adapted for use in many different applications.

SUMMARY OF THE INVENTION

The present invention is a linear motor which provides stepwise, incremental advance of a movable member and a workpiece attached thereto. The linear motor comprises an electric coil surrounded by an outer magnetic core. A magnetic, movable pole member and a magnetic plunger are slidably disposed through and extend outward from opposite sides of the outer magnetic core and coil. The magnetic movable pole member and the magnetic plunger are normally separated by an air gap.

An incremental advance member is fixedly attached to the plunger and extends slidably through and outward from the movable pole member. The core, pole member and plunger form a magnetic flux path which causes the plunger to be attracted into contact with the pole member thereby advancing the incremental advance member and closing the air gap between the pole member and the plunger when electric current is applied to the coil.

Biasing means are connected between the incremental advance member and the pole member for biasing the pole member away from the plunger to re-establish the air gap between the pole member and the plunger. Latch means operably coupled to the pole member and the plunger allow one directional movement of the pole member and the plunger with respect to the core and coil.

In a preferred embodiment, the biasing means comprises at least one and, preferably, a pair of coil springs connected between the end of the incremental advance member and one end of the pole member. A stop member is mounted on the incremental advance member for limiting forward movement of the pole member to re-establish the air gap between the pole member and the plunger.

The linear motor of the present invention is of simple construction and can be adapted for many different applications which require incremental, stepped advance of a movable member or workpiece.

BRIEF DESCRIPTION OF THE DRAWINGS

The various features, advantages and other uses of the present invention will become more apparent by referring to the following detailed description and drawing in which:

FIG. 1 is a plan view of a linear motor constructed in accordance with the teachings of the present invention;

FIG. 2 is a side elevational view of the linear motor shown in FIG. 1;

FIG. 3 is a perspective view of one of the latch means employed in the linear motor of the present invention;

FIG. 4 is a bottom view of the latch means shown in FIG. 3;

FIG. 5 is a partial, plan view showing the operation of the latch means employed in the linear motor of the present invention; and FIGS. 6A, 6B and 6C are partial, plan views showing the sequential states of various components of the linear motor during the operation of the linear motor of the present invention.

DESCRIPTION OF THE PREFERRED EMBODIMENTS

Throughout the following description and drawing, an identical reference number is used to refer to the same component shown in multiple figures of the drawing.

The linear motor 10 of the present invention provides incremental, stepwise advance of a movable member and a workpiece attached thereto upon successive energizations of the linear motor 10.

As shown in FIGS. 1 and 2, the linear motor 10 includes an electric coil 12 and an outer magnetic core 14. The electric coil 12 is formed of a plurality of turns or windings of an electrical conductor about a bobbin, not shown, which forms an internal bore extending through the coil 12. Outer frame members 16 and 18 provide sideways support for the windings of the coil 12. Leads, not shown, are connected to the ends of the windings of the coil 12 to provide electric current thereto.

The magnetic core 14 is formed of a suitable magnetic material, such as iron or other ferrous material. The outer core 14 is formed of a plurality of legs 20 constructed of thin laminations or a solid layer of magnetic material. The legs 20 are arranged in a substantially square or rectangular cross section as shown in FIG. 2, and surround the coil 12.

As is well known, the application of electric current to the coil 12 induces a magnetic field in the core 20 causing magnetic flux to flow therethrough.

A coil support tube 22 having a substantially circular cross section extends through the internal bore in the coil 12. One end of the tube 22 terminates in an outwardly extending flange 24 which is secured to one leg 20 of the core 14.

Two opposed legs 20 of the core 14 have apertures 26 formed therein which are coaxially aligned with the internal bore in the coil 12.

The magnetic circuit of the linear motor 10 also includes a movable pole member 30 and a movable plunger 32. Both the pole 30 and the plunger 32 are formed of magnetic material having a substantially circular cross section and are slidably disposed so as to extend through the apertures 26 in the core 14 into the internal bore in the coil 12 as shown in FIGS. 1 and 2.

The outermost end portions of the pole 30 and the plunger 32 have a pair of opposed flats 34 and 36 formed thereon for reasons which will be described in greater detail hereafter. Thus, as shown in FIGS. 1 and 2, the outermost end 38 of the pole member 30 and the end 40 of the plunger 32 extend outward from the coil 12. The inner ends 42 and 44 of the pole 30 and plunger 32, respectively, are spaced apart by an air gap shown by reference number 46.

The application of electric current to the coil 12 induces a magnetic field in the core 14 causing magnetic flux to flow through the core 14. This generates a magnetic attraction between the opposed faces 42 and 44 of the pole 30 and the plunger 32 urging the plunger 32 into contact with the pole 30 and closing the air gap 46.

An incremental advance member 50 in the form of a guide rod is attached to and extends outward from the plunger 32. The guide rod 50 is formed of a non-magnetic material and has a substantially circular cross section. In a preferred embodiment, coaxial bores are formed in the pole 30 and plunger 32 through which the guide rod 50 extends. One end of the guide rod 50 is secured to the plunger 32 by means of a set of screw 52. One end of the guide rod 50 may be made flush with the end 40 of the plunger 32 or extend outward therefrom as shown in FIGS. 1 and 2 for connection to a workpiece. The other end of the guide rod 50 extends outward a substantial distance from the end 38 of the pole 30. The pole 30 and the guide rod 50 are slidably disposed with respect to each other.

Means are provided for moving the pole member 30 to re-establish the air gap 46 between the pole member 30 and the plunger 32 after current has been removed from the coil 12. Preferably, the moving means 54 comprises at least one and, preferably, a pair of biasing means 56, such as coil springs. A first collar 58 is mounted on the outermost end of the guide rod 50. A second collar 60 is mounted adjacent to the end 38 of the pole 30. The biasing springs 56 are connected between the collars 58 and 60 through the use of suitable apertures, clips, etc. Extension of the guide rod 50 with respect to the pole 30, as described hereafter, causes extension of the springs 56 between the collars 58 and 60. When the magnetizing force has been removed from the motor 10, the pole 30 may advance under the movement of the springs 56 returning to their normal state.

The linear motor 10 also includes latch means shown in general by reference number 62. The latch means 62 provides unidirectional movement of the pole 30 and plunger 32 in one direction with respect to the coil 12 and core 14 during operation of the linear motor 10. It should be understood that the latch means 62, shown in FIGS. 1-5, is illustrated only as an example, and many different types of latches may be employed to provide the desired unidirectional movement of the pole 30 and plunger 32.

In a preferred embodiment, the latch means 62 comprises a pair of latch members 64 associated with the pole 30 and the plunger 32. The latch members are positioned on a latch platform or base 66. The platform 66 surrounds the core 14 and may be secured thereto by any suitable means, not shown. Individual latch mounts 68 are mounted on the platform 66 and are associated with each latch member 64.

As shown more clearly in FIGS. 3 and 4, each latch member 64 has an elongated arm portion 70 from which extends a cam 72. The cam 72 has an eccentric cross section. The cam 72 is movably positioned in a recess 74 formed in the latch mount 68, with the arm 70 extending over the latch mount 68. The latch member 64 is positioned for movement between a movement allowing position and a movement blocking position as shown in FIG. 1 and, in more detail, in FIG. 5. Biasing means 76 in the form of a coil spring extends between adjacent latch members 64 from a pin 78 on each arm 70 for biasing the latch members 64 to the movement blocking position illustrated in FIG. 5.

In operation, the latch members 64 are normally positioned so that the cams 72 are in their movement blocking position preventing movement of the pole 30 and plunger 32 to the left in the orientation shown in FIG. 1. In this position, the peripheral faces of the cam 72 of each latch member 64 frictionally engage the flats 34 and 36 on the pole 30 and the plunger 32 preventing movement to the left as viewed in FIG. 1. When the linear motor 10 is energized, as described in greater detail hereafter, the magnetic force and biasing force of the spring 56 enables the pole 30 and the plunger 32 to move to the right in the orientation shown in FIG. 1 which causes the cams 72 to pivot to their movement allowing position allowing movement of the pole 30 and the plunger 32 to the right. However, return movement to the left is prevented since such movement would urge the cams 72 into tight frictional engagement with the flats 34 and 36 on the pole 30 and the plunger 32. Thus, the pole 30 and the plunger 32 are held in their incrementally advanced position.

The incremental advance member 50 may be returned to its initial start position by use of release means, not shown, which cause the cams 72 to pivot to the movement allowing position in which the cams 72 are disengaged from the pole 30 and the plunger 32 thereby allowing movement of the pole 30 and the plunger 32 in the leftward direction to the start position in the orientation shown in FIG. 1.

The operation of the linear motor 10 of the present invention will now be described in conjunction with FIGS. 6A, 6B and 6C. In FIG. 6A, the components of the linear motor 10 are shown in their normal, de-energized position. In this state, the opposed faces 42 and 44 of the pole 30 and the plunger 32, respectively, are spaced apart by the air gap 46. The biasing springs 56 extending between the first collar 58 and the second collar 60 are also in their unextended position.

Upon energization, through the application of electric current to the coil 12, magnetic flux induced in the core 14 causes the plunger 32 to be attracted toward the pole 30 until its face 44 contacts the face 42 of the pole 30 as shown in FIG. 6B. Since the guide rod 50 is attached to the plunger 32, it also moves to the right in the orientation shown in FIG. 6B, extending the springs 56.

The guide rod 50 moves a distance to the right equivalent to the initial air gap 46 as shown by the arrow denoted by reference number 80. The latches 62 maintain the pole 30 in its initial stationary position preventing movement to the left toward the plunger 32.

When current is removed from the coil 12, there remains no magnetic attraction between the pole 30 and the plunger 32 such that the pole 30 may move to the right under the bias of the springs 56 returning to their normal, unextended position. This urges the pole 30 to the right to the position shown in FIG. 6C, which reestablishes the air gap 46 between the opposed faces 42 and 44 of the pole 30 and plunger 32. The latches 62 maintain the plunger 32 in its incrementally advanced position thereby holding the guide rod 50 in its advanced position until the next energization of the coil 12. FIGS. 6C and 6A show the components of the linear motor 10 in the same relative position, but with the components FIG. 6C incrementally advanced to the right in by the distance of the original air gap 46. Successive energizations of the coil 12 results in successive incremental movement of the guide rod 50 to the right in successive distances equal to the original air gap.

In summary, there has been disclosed a unique linear motor which provides stepwise, incremental advance of a movable member upon repeated energization of the motor. The motor may be designed for use in a wide number of applications which have need for incrementally advanced members in repeated operation.

What is claimed is:

1. A linear motor comprising:
   a coil formed of a plurality of windings;
   a magnetic core surrounding the coil;
   a magnetic pole member movably disposed within and extending partially outward from one end of the coil and the core;
   a magnetic plunger movably disposed within and extending partially outward from another end of the coil and the core, the plunger being coaxially aligned with the pole member and normally spaced from one end of the pole member by an air gap;
   an incremental advance member fixedly connected to the plunger;
   biasing means, connected between the incremental advance member and the pole member, for biasing the pole member away from the plunger to establish the air gap between the pole member and the plunger;
   the core, pole member and plunger forming a magnetic flux path when current is applied to the coil to urge the plunger into contact with the pole member to close the air gap therebetween and to incrementally advance the incremental advance member; and
   unidirectional means for allowing successive one direction movements of the pole member and the plunger with respect to the core and coil upon each successive energization and de-energization of the coil.

2. The linear motor of claim 1 wherein the biasing means comprises:
   a spring connected between one end of the incremental advance member and one end of the pole member; and
   the incremental advance member being slidably disposed through and extending outward from the pole member.

3. The linear motor of claim 2 further including:
   stop means, mounted on the incremental advance member, for limiting movement of the pole member to reestablish the air gap between the pole member and the plunger.

4. The linear motor of claim 1 wherein the unidirectional means comprises:
   at least one latch member associated with each of the pole member and the plunger;
   the latch member being movable between a movement allowing position and a movement locking position; and
   means-for biasing the latch member to the movement locking position.

5. The linear motor of claim 4 further including:
   a pair of latch members associated with each pole member and each plunger; and
   the biasing means extends between the latch members in each pair of latch members for normally biasing each latch member to the movement locking position.

6. The linear motor of claim 4 wherein the latch member includes:
   an eccentric cam engaging face engageable with the pole or the plunger to prevent movement thereof in one direction.

7. A linear motor comprising:
   a coil formed of a plurality of windings;
   a magnetic core surrounding the coil;
   a magnetic pole member movably disposed within and extending partially outward from one end of the coil and the core;
   a magnetic plunger movably disposed within and extending partially outward from another end of the coil and the core, the plunger being coaxially aligned with the pole member and normally spaced from one end of the pole member by an air gap;
   an incremental advance member fixedly connected to the plunger and slidably disposed through and extending outward from the pole member;
   stop means, mounted on the incremental advance member, for limiting movement of the pole member to reestablish the air gap between the pole member and the plunger;
   biasing means, connected between the incremental advance member and the pole member, for biasing the pole member away from the plunger to establish the air gap between the pole member and the plunger;
   the core, pole member and plunger forming a magnetic flux path when curent is applied to the coil to urge the plunger into contact with the pole member to close the air gap therebetween and to incrementally advance the incremental advance member; and
   unidirectional means for allowing successive one direction movements of the pole member and the plunger with respect to the core and coil upon each successive energization and de-energization of the coil, the unidirectional means including at least one latch member associated with each pole and plunger, each latch member being movable between a movement allowing position and a movement locking position, and means for brasing each latch member to movement locking position.

* * * * *